Aug. 16, 1949.  R. W. AUXIER ET AL  2,479,290
LAMINATING MACHINE

Original Filed March 18, 1944  3 Sheets-Sheet 3

WITNESSES:

INVENTORS
Robert W. Auxier and
Patrick Norelli
BY
James N. Ely
ATTORNEY

Patented Aug. 16, 1949

2,479,290

UNITED STATES PATENT OFFICE 2,479,290

LAMINATING MACHINE

Robert W. Auxier and Patrick Norelli, Pittsburgh, Pa., assignors to Westinghouse Electric Corporation, East Pittsburgh, Pa., a corporation of Pennsylvania Original application March 18, 1944, Serial No. 527,126. Divided and this application October 29, 1945, Serial No. 625,430

2 Claims. (Cl. 154—1)

This application relates to a machine for effecting the curing of composite plates or sheets, and in particular to a machine which utilizes a high-frequency electrical field for curing such composite plates or sheets.

This application is a division of our copending application Serial No. 527,126, which was filed March 18, 1944.

An object of this invention is to provide a machine for applying a progressively increasing pressure to laminated sheets of fibrous material having a resinous binder associated therewith to effect the compacting thereof.

Another object of this invention is to provide in a machine utilized for applying pressure to a moving composite mass for adjusting the pressure applied whereby the pressure may progressively vary in the direction of the moving mass.

Another object of this invention is to provide for dielectrically heating a moving composite mass to effect the uniform heating thereof.

A more specific object of this invention is to provide for dielectrically heating a moving composite mass carrying a resinous material while simultaneously therewith subjecting the mass to a progressively increasing pressure to effect the continuous consolidation of such composite mass.

Figure 1:
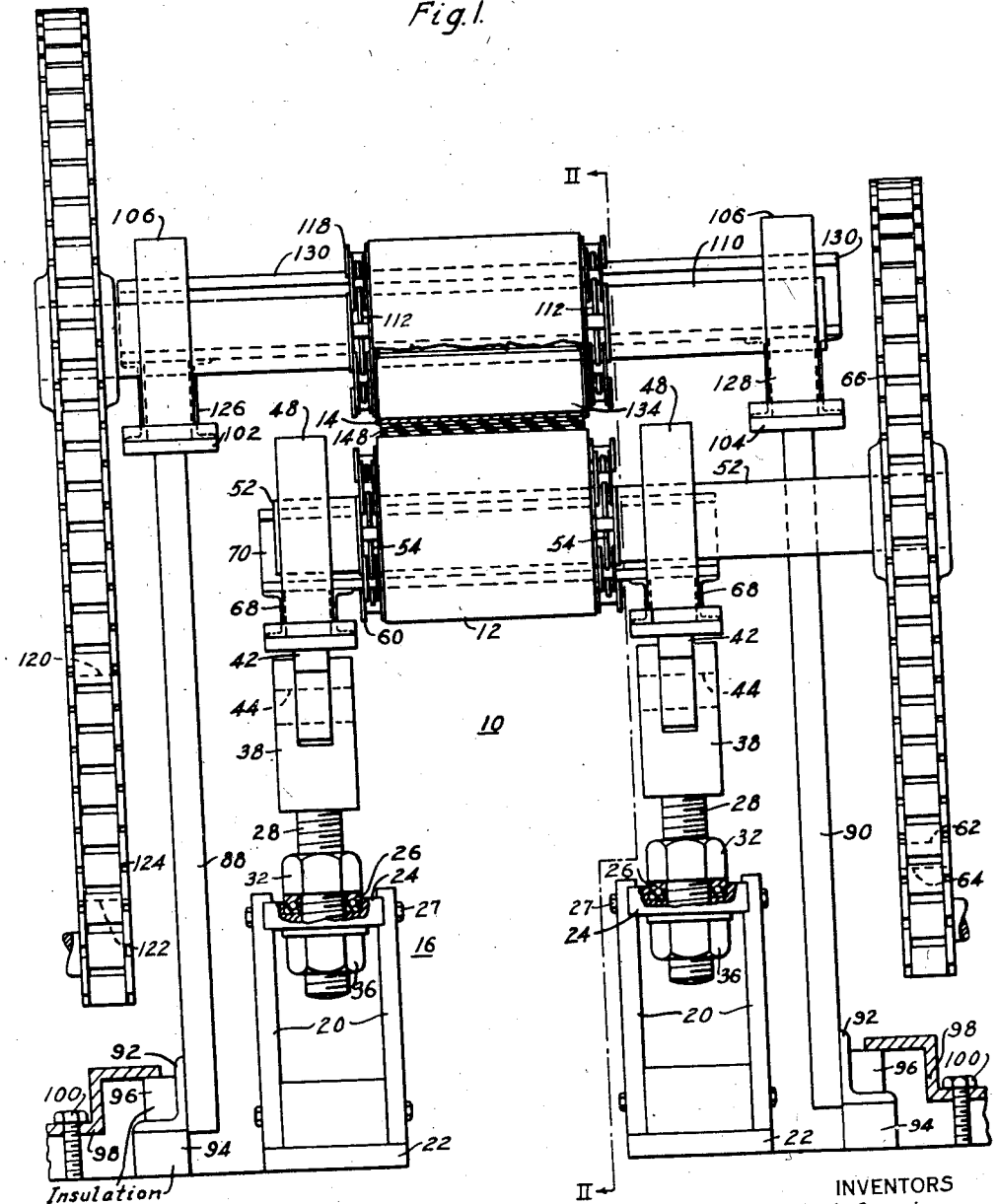
Figure 2:
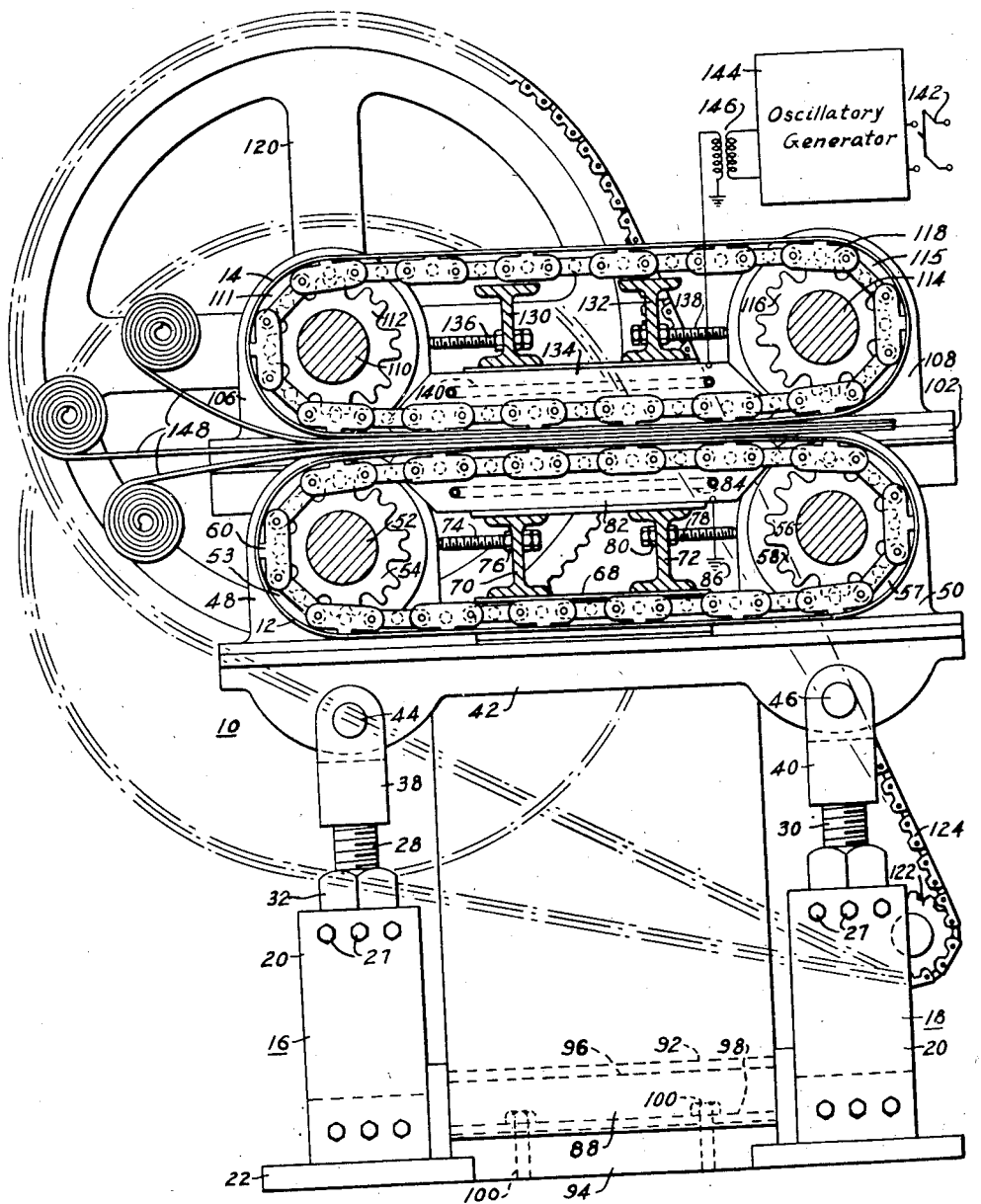
Figure 3:
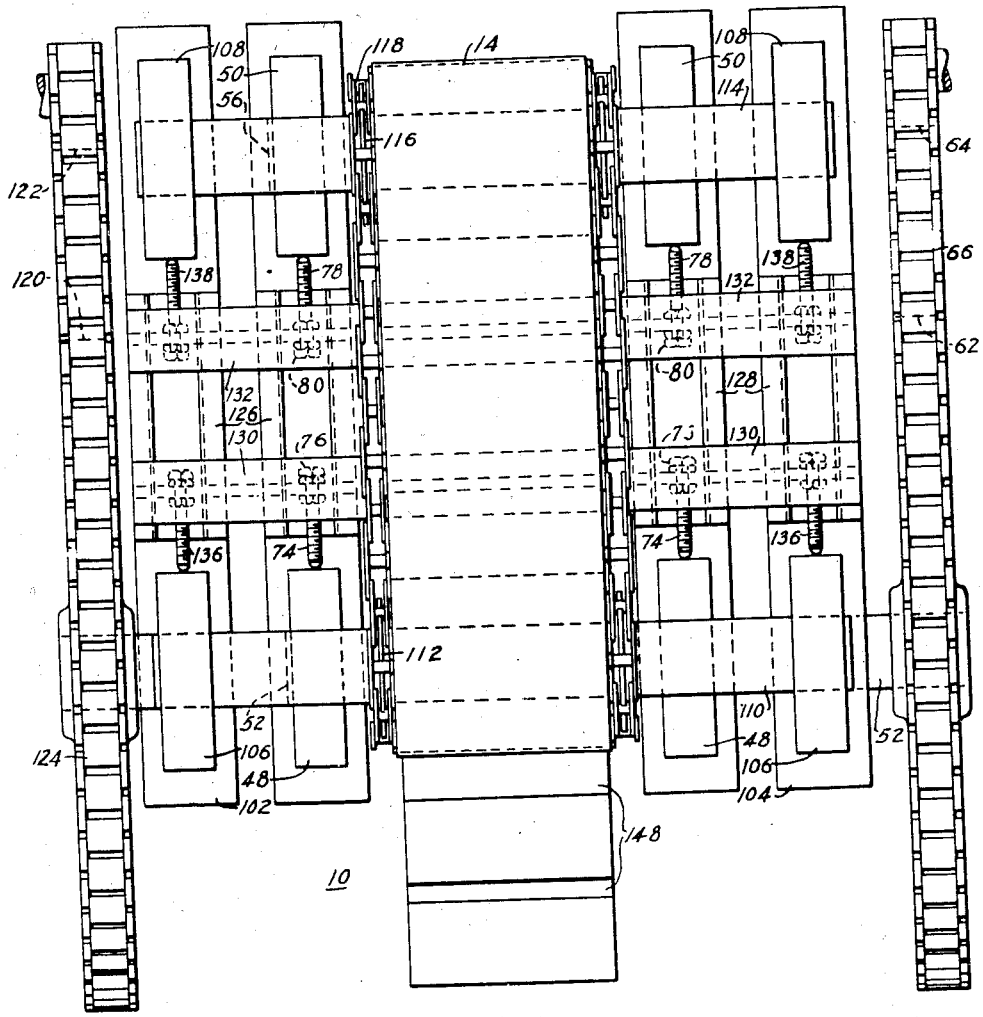

Other objects of this invention will become apparent from the following description when taken in conjunction with the accompanying drawings, in which:

Figure 1 is a view in elevation and partly in section of a machine embodying the teachings of this invention, Fig. 2 is a view in side elevation and partly in section of the machine as taken along the line II—II of Fig. 1, and Fig. 3 is a top plan view of the machine embodying the teachings of this invention.

Referring to the drawings, this invention is illustrated by reference to the continuous molding machine 10. The molding machine 10 utilizes a pair of endless belts 12 and 14 formed of a flexible metallic material such as stainless steel or the like disposed with their inner stretches in spaced relation to one another in a predetermined manner and independently supported.

In order to support the lower endless belt 12, a pair of spaced support members 16 are disposed in line with the receiving end of the endless belts and a similar pair of spaced support members 18 are disposed at the delivery end of the endless belts. The pair of support members 18 is so disposed with respect to the pair of support members 16 that one of the support members 18 is in alignment with one of the support members 16 on one side of the belt 12 while the other support member 18 is in alignment with the other of the support members 16.

Each of the supports 16 and 18 is similar and, as shown in detail in Fig. 1, is formed of a pair of side plates 20 suitably bolted to a base member 22 disposed to seat on any suitable foundation, the upper ends of the spaced side plates 20 carrying a thrust plate 24 and a thrust bearing 26. The thrust plate 24 is secured in position between the side plates 20 by any suitable means such as by means of the bolts 27 illustrated. Strain rods 28 and 30 are carried by the support members 16 and 18, respectively, each of the strain rods carrying a nut 32 for seating on the thrust bearing 26 and a nut 36 for securing the strain rod in adjustable assembled relation with respect to the thrust plate 24. The upper end of each pair of aligned strain rods 28 and 30 carries clevises 38 and 40 respectively for receiving a supporting bar 42 which is provided with downwardly projecting flanges for fitting into the clevises 38 and 40 being pivotally held in position with respect thereto by means of the pins 44 and 46.

As illustrated in Figs. 1 and 2, supporting bars 42 are disposed to extend between aligned support members 16 and 18 for forming the frame disposed to carry the endless belt 12. The upper surfaces of the supporting bars 42 are substantially flat surfaces disposed for receiving a bearing housing 48 at the receiving end of the frame and a bearing housing 50 at the delivery end of the frame. The bearings (not shown) within the bearing housings 48 carried by the frame members 42 are aligned for receiving and supporting a drive shaft 52 which carries a pulley 53 and a pair of spaced sprocket wheels 54 disposed at the ends of the pulley 53 at the outer edges of the endless belt 12. The pulley 53 has a substantially smooth surface for receiving the belt 12 and has a length substantially equal to the width of the belt. Similarly the bearings (not shown) in the bearing housings 50 carried at the other end of the supporting bars 42 are aligned for receiving a shaft 56 which likewise carries a pulley 57 for receiving a belt 12 and spaced sprocket wheels 58 disposed at the ends of the pulley 57 adjacent the edges of the endless belt 12.

In order to drive the endless belt 12, a link belt 60 is disposed at each of the edges of the endless belt 12, the link belt 60 being secured to the edge of the endless belt 12 in any suitable manner and being so disposed that the teeth of the sprocket wheels 54 and 58 engage the cross bars of the link belt. Power for supplying the energy necessary to drive the belt 12 is supplied through a drive sprocket 62 carried at the outer end of the drive shaft 52, the drive sprocket being connected to a drive gear 64 as by means of a roller chain drive 66. Although not shown, it will be understood that the drive gear is connected to any suitable source of power such as a motor through any suitable gear reduction mechanism necessary for controlling the speed of movement of the belt 12.

In addition to carrying the bearing housings 48 and 50, each of the supporting bars 42 is provided with a channel member 68 disposed centrally along the length of the supporting bar and of a height sufficient that its upper edge is above the links of the outer stretch of link belt 60. As illustrated in Figs. 1 and 2, two I-beam members 70 and 72 are disposed to seat on the channel members 68, the I-beams 70 and 72 extending across the space between the spaced supporting bars 42. The I-beams 70 and 72 may be secured to the channel member and the channel member 68 secured to the supporting bar 42 by any suitable means such as by welding (not shown). A tension screw 74 and nuts 76 are mounted adjacent each of the ends of the I-beam 70 to seat against the bearing housings 48, a tension screw 78 and nut 80 also being provided adjacent each of the ends of the I-beam 72 for seating against the bearing housing 50, the tension nuts and screws thereby cooperating when adjusted with respect to the bearing housings to adjust the tension applied to the endless belt 12.

In order to support the inner stretch of the endless belt 12 with respect to the inner stretch of the endless belt 14, an electrode platen 82 having a smooth substantially flat upper surface is disposed to seat on the upper edges of the I-beams 70 and 72 in sliding engagement with the inner surface of the inner stretch of the belt 12. The electrode platen has a length substantially equal to that of the inner stretch of the belt 12, and as the electrode platen 82 is secured to the I-beams 70 and 72, it will be appreciated that the electrode platen is stationary with respect to the frame supporting the endless belt 12. As illustrated, the electrode platen 82 is cored as at 84 so that it can be heated as by passage of steam from any suitable source (not shown) therethrough, the purpose of which will be explained more fully hereinafter. The electrode platen 82 comprising the low potential electrode of the machine may be grounded as illustrated at 86, or the connection 86 may be omitted, the electrode platen thereby being grounded through the supports 16 and 18 which carry the supporting bars 42.

As opposed to the supports for the endless belts 12, the supports of the upper endless belt 14 are stationary. As illustrated in the drawings, the supports for the upper belt 14 comprises a pair of spaced plates 88 and 90, each of which is provided with an angle member 92 at its lower end for facilitating the mounting of the supports. As illustrated in Fig. 1, the supports 88 and 90 are maintained in position while electrically insulating them from ground. In order to insulate them from ground, the angle member 92 of the supports may set on a block 94 of insulating material such as zircon-porcelain and other zircon type of ceramic materials, another block 96 of the insulating material being provided on the other side of the angle 92 and the whole clamped to the foundation as by means of the angle 98 and the screw 100.

The upper ends of each of the supporting plates 88 and 90 carry supporting bars 102 and 104, respectively, each of which is provided with a substantially flat upper surface. Similarly to the supporting bars 42 each of the upper supporting bars 102 and 104 carry a bearing housing 106 adjacent the receiving end of the endless belt 14 and a bearing housing 108 adjacent the delivery end of the endless belt 14. The bearings (not shown) in the pair of bearing housings 106 are aligned to receive the driving shaft 110, which, similar to the driving shaft 52, is provided with a pulley 111 for the belt 14 and spaced sprocket wheels 112 disposed adjacent the edges of the belt 14, the bearings (not shown) of the bearing housings 108 likewise being aligned for receiving the shaft 114 which also carries a pulley 115 for the other end of belt 14 and a pair of spaced sprocket wheels 116 adjacent the edges of the endless belt 14. The upper endless belt 14 is also provided with a link belt drive 118 at each of its edges disposed for engagement with the teeth of the spaced sprocket wheels 112 and 116 for driving the belt 14. Power for driving the belt 14 is supplied to the driving shaft 110 through the drive sprocket 120 connected to the drive gear 122 by the roller chain drive 124. The drive gear 122 may be actuated similarly to the drive gear 64 by any suitable motor through any suitable gear reduction mechanism (not shown). In this instance, however, the motor and linkage for delivering the power from the motor to the driving gear must be suitably insulated from ground, the reasons for which will appear hereinafter.

As illustrated in Fig. 1, each of the supporting bars 102 and 104 is provided with centrally disposed channel support members 126 and 128, respectively, I-beam members 130 and 132 being disposed across the channel members 126 and 128 for supporting an upper electrode platen 134. Each of these members is preferably welded to each other and to the supporting bars for providing an integral structure. The I-beams 130 and 132 are also provided with the tension screw assemblies 136 and 138, respectively, for seating against the bearing housings 106 and 108, respectively, to adjust the tension in the endless belt 14 disposed on and between the spaced pulleys 111 and 115.

The electrode platen 134 is cored as at 140 for effecting the heating thereof similar to the electrode platen 82 associated with the lower endless belt 12 and is likewise provided with a flat surface for engaging the inner surface of the inner stretch of belt 14 for maintaining the inner stretch of the belt 14 as a substantially flat surface. As illustrated, the electrode platen 134 constitutes a high potential electrode being disposed to be electrically connected to a suitable source of alternating current power (not shown) through a switch 142, a suitable generator 144 being provided for delivering high-frequency high-voltage energy through a coupling transformer 146. Since the platens 82 and 134 engage the inner surfaces of the inner stretches of belts 12 and 14 respectively, it will be appreciated that when the high potential electrode platen 134 is connected to the alternating current source of power as described that a high frequency high voltage difference of electrical potential is impressed between the inner stretches of the belts to set up an electrical field therebetween.

In operation, the endless belts 12 and 14 are driven at some predetermined speed and when the switch 142 is closed the source of high frequency electrical power generates a high frequency electrical field between the inner stretches of the belts 12 and 14. Thus when sheets 148 of fibrous material such as cloth, duck, or the like, which have been treated with a resinous binder such as a phenolic, urea or other type of resin are delivered to the space between the belts 12 and 14 in laminated relation, they pass through the electrical field and become uniformly heated. In operating the machine, the endless belts 12 and 14 are adjusted by pivotally adjusting the position of the lower supporting bars 42 to provide a predetermined space between the inner stretches of the belts depending upon the amount of material supplied to the belts and the thickness of the consolidated sheet or plate removed from the machine.

As will be apparent, the position of the supporting bars 42 and consequently the frame structure and electrode platen 82 supporting the lower belt 12 can be readily adjusted by adjusting the position of the nuts 32 and 36 associated with the strain rods 30 to elevate one end of the frame. Where desired, both ends of the frame can be adjusted by adjusting the position of the strain rods 28 and 30. However, in practice it is preferred to have the receiving end of the belt 12 a little lower than the opposite end thereof, so that, in effect, the space between the endless belts 12 and 14 is in the form of a tapered opening extending lengthwise of the belts in the direction of drawing the fibrous material. By providing the tapered opening, it is apparent that the pressure applied to the sheet material by reason of its passage between the belts is progressively increased in the direction of movement of the sheet and that by adjusting the position and angle of the frame supporting belt 12 that the pressure applied can be readily controlled.

As will be understood, since the source of power for generating the electrical field is alternating current the high frequency electrical waves utilized in developing the dielectric heat within the laminated sheets of fibrous material has a sinusoidal characteristic. Thus at some point on the curve of electrical potential there is a maximum potential and at some other point on the curve there is a minimum potential. In practicing the present invention, it is preferred to employ a frequency ranging between 5 and 50 megocycles it being found that the sinusoidal characteristic has no detrimental effect in the articles cured or molded as the laminated sheets 148 move continuously through the electrical field. This is because every part of the moving laminate will receive the same dielectric effect by the time it emerges from the inner stretches of the continuous belts. Thus, although the electrical field varies in potential from the receiving end to the delivery end of the endless belts, every part of the sheet consolidated in the machine of this invention goes through the same variation in potential and is therefore uniformly heated.

By utilizing the electrode platens described hereinbefore, it is possible to so heat the electrode platens by the use of steam prior to actual use of the machine in consolidating the laminated sheets by use of the electrical field so that when a difference in potential is established between the inner stretches of the endless belts 12 and 14 the steam heated platens 82 and 134 prevents loss of heat by conduction from the laminated sheets as they pass between the inner stretches of the belts. In practice, where the platens 82 and 134 are heated to a degree less than that necessary for effecting the curing of the laminated sheets, the heat is sufficient for preventing loss of the heat from the laminated material passing through the electrical field.

By utilizing the invention described hereinbefore, it is possible to considerably reduce the time necessary in effecting the curing of laminated fibrous material having a resinous binder associated therewith while at the same time obtaining a uniformly cured product.

Another advantage of curing laminated sheets in accordance with the teachings of this invention is that low pressures in the neighborhood of 300 pounds per square inch are satisfactory in conjunction with the electrical field for effecting the polymerization of the resin and the consolidation of the laminated sheet. This is because the method used does not depend upon thermal conductability for the heating effect, but, instead, the high frequency electrical field causes agitation of the molecules of the material being treated and as a result of the molecular friction the electrical energy is transferred to thermal energy referred to as the dielectric loss effect. By thus developing the heat within the material being treated, low pressures may be used to impart full density to the sheets. By utilizing the progressively increasing pressure as described hereinbefore, the sheets are more readily compacted since the increase accompanies the softening of the resinous binder.

Further, the method is continuous as the sheets of fibrous material usually come in large rolls and successive rolls may be spliced to the end as a finished roll which has been supplied to the machine. As will readily be appreciated the length of the belts will depend upon the length of time necessary for curing the resinous binder. This of course depends upon the resinous binder as well as the thickness of the composite sheet being formed. This can readily be determined experimentally for sheets of different compositions and thicknesses. As the cured plate or sheet is removed from the inner stretches of the endless belts, it can be readily severed by any of the well known means for the formation of plate stock or the like having a predetermined length.

We claim as our invention:

1. A machine for curing composite plates or sheets comprising, in combination, a pair of spaced flexible metallic endless belts between which the sheet passes and which are adapted to apply pressure thereto, a frame for each of the endless belts disposed to support the belts independently of one another, means for electrically insulating one of the frames from ground, an electrode platen carried by each of the frames in supporting engagement with substantially the entire length of the inner surface of the inner stretch of the belt supported thereby, and means for adjusting an end of one of the frames to change the angle thereof and simultaneously therewith change the angle of the platen and belt supported thereby throughout their lengths with respect to the other supported belt to provide a tapered opening between the spaced belts.

2. A machine for curing composite plates or sheets comprising, in combination, a pair of spaced flexible metallic endless belts between which the sheet passes and which are adapted to apply pressure thereto, a frame for each of the endless belts disposed to support the belts independently of one another, means for electrically insulating one of the frames from ground, an electrode platen carried by each of the frames in supporting engagement with substantially the entire length of the inner surface of the inner stretch of the belt supported thereby to impress a high frequency high voltage difference of electrical potential between the inner stretches of the spaced belts, means for driving the belts to draw the sheet therebetween whereby the difference of electrical potential sets up an electrical field in the sheet to develop heat therein as the sheet passes between the inner stretches of the belts, and means for adjusting an end of one of the frames to change the angle thereof and simultaneously therewith change the angle of the platen and belt supported thereby to change the angle of the belt throughout its entire length while maintaining the platen in supporting engagement with the belt to provide a tapered opening between the spaced belts.

ROBERT W. AUXIER.
PATRICK NORELLI.

REFERENCES CITED

The following references are of record in the file of this patent:

UNITED STATES PATENTS

| Number | Name | Date |
| --- | --- | --- |
| 1,361,970 | Dickey | Dec. 14, 1920 |
| 2,231,457 | Stephen | Feb. 11, 1941 |
| 2,324,068 | Crandell | July 13, 1943 |
| 2,388,824 | Brown | Nov. 13, 1945 |